March 7, 1939.  A. R. ALLARD  2,149,490
AUTOMATIC WELDING
Filed April 14, 1936  2 Sheets-Sheet 2

WITNESSES:
James K. Moser
E. Lutz

INVENTOR
ARTHUR R. ALLARD.
BY
A. B. Reavis
ATTORNEY

Patented Mar. 7, 1939

2,149,490

UNITED STATES PATENT OFFICE 2,149,490

AUTOMATIC WELDING

Arthur R. Allard, Drexel Hill, Pa., assignor to Westinghouse Electric & Manufacturing Company, East Pittsburgh, Pa., a corporation of Pennsylvania Application April 14, 1936, Serial No. 74,244

5 Claims. (Cl. 219—8)

My invention relates to a machine for electric welding and it has for an object to improve the electrical contact with the metallic rod of a flux-covered rod.

In the prior art, various ways have been proposed to secure good electrical contact with the metallic core of a coated welding rod. In some cases, flux has been removed to provide for the electrical contact. It has also been proposed to modify the rod or wire so as to have metallic portions or protuberances extending through the flux to establish the necessary electrical contact. In these devices, because of the special nature and application of the contact device required or because of imperfect modification or alteration of the coated rod structure to provide for contact, irregularities in resistance may occur at the point or points of contact with consequent irregularities in the action of the welding arc. In the prior art of machine welding with bare rod or wire, little, if any, difficulty is encountered on account of the electrical contact, and machines using bare rod are reliable and regular in their action. Another contributing feature to bare rod welding is that the wire rod is ordinarily given surface treatment, for example, a lime finish, to prevent a wild arc. Because of these better operating conditions with the bare rod welding machine, in accordance with the present invention, the advantages of a bare rod, so far as surface treatment and the electrical contact are concerned, are preserved, flux in strip form being supplied to the rod issuing from the nozzle or contact device and means being provided to cause the flux in strip form to encompass the rod and to be fed along, by and with the latter to the welding location. While it has heretofore been proposed to helically wrap bare wire or rod leaving a contact device with flux tape, obviously such tape must possess sufficient inherent flexibility to permit of being wound on bobbins and of being wrapped by suitable mechanism on the rod or wire. As flux material is ordinarily somewhat stiff or brittle, although brittleness may be reduced by the use of suitable binders, the flux strip wrapped helically about the wire or rod must possess more of the characteristics of a flexible fiber tape than of a strip of flux. On the other hand, due to the way in which applicant applies his flux to the rod or wire, namely, by bringing complemental flux strips into longitudinal engagement with the wire or rod to feed along with the latter, relatively stiff strips or strips of any desired thickness may be used, or the strips may be wound on reels of suitably large radius, these features assuring that flux strips which are adequate from a welding standpoint may be provided without stiffness being a serious factor.

Accordingly, a further object of my invention is to provide a welding head with means for covering the bare rod issuing from the electrical contact device with flux in strip form and extending longitudinally of the rod.

These and other objects are effected by my invention as will be apparent from the following description and claims taken in connection with the accompanying drawings, forming a part of this application, in which:

Figure 1:
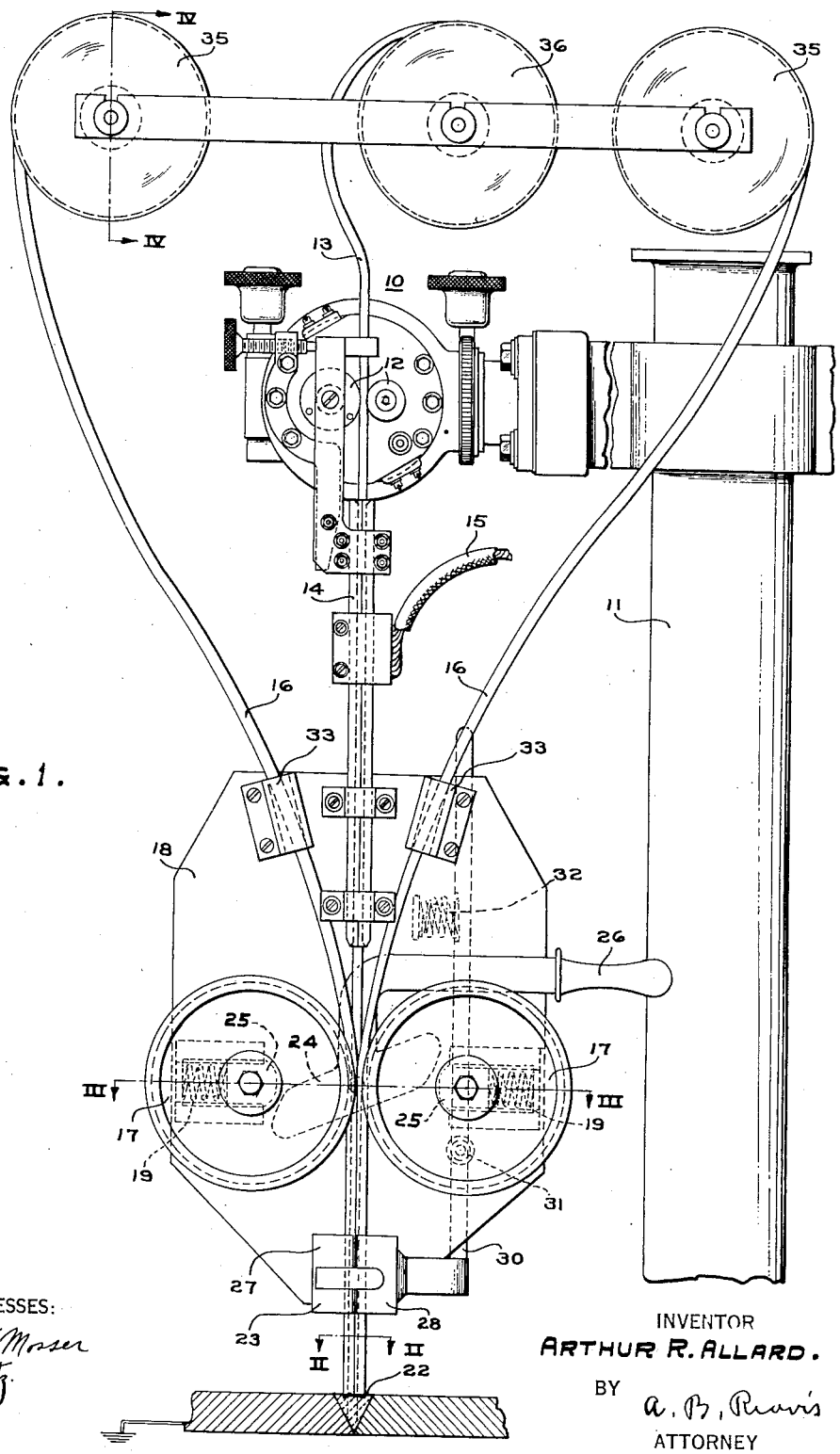
Fig. 1 is a front elevation of my improved welding machine.
Figure 3:
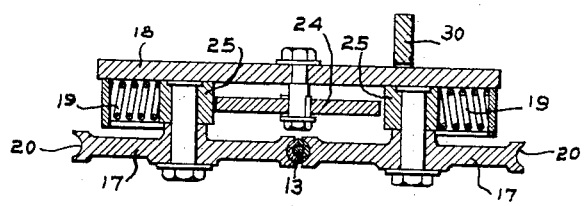
Fig. 3 is a sectional view taken along the line III—III of Fig. 1.
Figure 2:
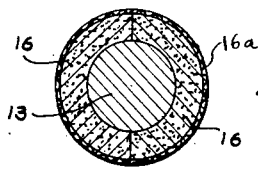
Fig. 2 is a sectional view taken along the line II—II of Fig. 1 and drawn to larger scale.

Referring to the drawings now more in detail, I show a welding head, at 10, of a known type of construction, the head being supported by any suitable means, for example, by means of a column 11. The head, at 10, includes the usual motor-operated feeding device or knurled rollers 12 cooperating with bare rod or wire 13 which is caused to pass through the elongated contact device or nozzle 14 having the usual electrical connection 15.

My invention comprises use of these known features of a welding head using bare rod, so far as feeding the rod and of establishing electrical contact with the rod are concerned, together with a novel arrangement of flux strip material for encompassing the rod issuing from the contact device or nozzle, the material preferably being fed along, by and with the rod and serving the same purpose as the coating flux of ordinary coated rod.

Referring to Fig. 1, it will be seen that a pair of pre-formed flux strips 16 extend downwardly and toward the rod 13, the strips being caused to envelop the rod immediately below the nozzle 14 and to engage the rod under pressure due to the action of means, such as the presser rolls 17, engaging the strips with rolling action. The presser rolls 17 are carried by the support 18 and they are urged toward each other by any suitable means, for example, by springs 19. The presser rolls 17 are grooved at 20 so that the rolls may grip the strips circumferentially and cause the latter to engage the rod 13 under sufficient pressure to be fed along with the latter to the welding location indicated at 22.

A guide 23 preferably cooperates with the flux-covered rod to keep the flux strips in proper relation with respect to the rod, the guide 23 being located a suitably short distance above the welding location 22. Thus, it will be seen that the component parts of the flux covering are held in place about the rod so as to function effectively as an encompassing welding flux during the welding operation.

To provide for proper initial engagement of the flux strips 16 with the rod 13 and proper starting of the rod with its flux covering down to the welding location, I prefer to provide means so that the presser rolls 17 may be separated. Accordingly, I show a cam 24 arranged between supporting blocks 25 carrying the presser rolls, the supporting blocks 25 engaging the springs 19 already referred to. If the lever 26 is pulled down, the blocks 25 will be caused to separate against the force of the springs 19 with the result that the presser rolls 17 are separated to afford access to the tapes and to the wire for any purpose, such as to start the feed or the strips encompassing the wire and drawn along by the latter.

While a guide 23 having an opening suitable to the outer diameter of the flux-covered wire may be used, I prefer to have the guide 23 also made as a multiple-part construction. Therefore, in Fig. 1, the guide 23 is shown as comprising the complementary parts 27 and 28, the part 27 being secured to the support 18 and the part 28 being movable with respect to the part 27 to afford access to the flux-covered rod. By way of example, the part 28 is shown carried by a lever 30 fulcrumed at 31 with respect to the support and having a spring or biasing means 32 cooperating therewith so as to cause the part 28 to move toward the part 27, the part 28 being moved from the part 27 by means of pressure exerted on the upper end of the lever 30.

The support plate 18 is preferably provided with guides 33 to direct the flux strips 16 to be fed along with the wire between the presser rolls.

As the flux strips are usually of a frangible nature, they should be fed and caused to engage the wire with a minimum of flexure. Accordingly, the strips are fed in the same general direction as and convergently at a small angle with respect to the wire. Aside from feeding of the strips in this way assuring of a small angle of flexure thereof, with consequent reduced likelihood of breakage, breakage is further minimized by having portions of the strips approaching the rolls 17 free to be flexed by the latter toward the wire so that the necessary flexure may be distributed over substantial portions of the strips approaching the rolls. The achievement of these results is facilitated by the provision of guides 33 arranged alongside of the brush or contact device 14 and directed convergently toward the wire issuing from the latter.

As the flux strips are pre-formed and substantially non-deformable and as they are of sufficient radial thickness to provide abutment side edges, the abutment of such side edges and the engagement of the inner concave surfaces of the strips with the wire assure of encompassment of the latter by the strips. These attributes of the strips make possible simplification of the mechanism in that it is unnecessary to complicate the latter with the provision of means for maintaining a predetermined relative feed relationship of the strips and the wire to assure proper positioning of the strips on the wire. In the present arrangement, it is merely necessary that the strips be started between the presser rolls and the wire, and the encompassing relation will be preserved due to cooperation of the side edges and of the concave surfaces thereof with the wire.

As may be seen from Figs. 1, 2, 3, and 4, each flux strip 16 is preferably pre-formed, each strip being semi-circular in cross-section so that, when two strips are brought together, they complementarily form a cylindrical shell encompassing the weld rod 13.

Preferably, the strips 16 are withdrawn from reels 35, the weld rod 13 being also withdrawn from a reel 36. As the weld rod 13 issues from the nozzle or contact device 14 and passes between the presser rolls 17, the latter causing the two complementary semi-circular strips to be engaged with the rod under pressure, it will be obvious that the strips will be drawn along from the reels 35 to travel with the rod 13 with the result that the rod is covered by the complementary semi-circular pre-formed flux parts.

Any suitable flux capable of being pre-formed in usable strip form may be used; and, as pointed out in my application, Serial No. 74,886, filed April 17, 1936, it may be desirable to have the outer face of the flux embedded in a fibrous tape 16a to give adequate tensile strength. By having an outer fibrous covering united with the flux, the presser rolls engaging the strips will be less likely to fracture the flux. Furthermore, should the flux crack, it will be held together by the covering.

Figure 4:
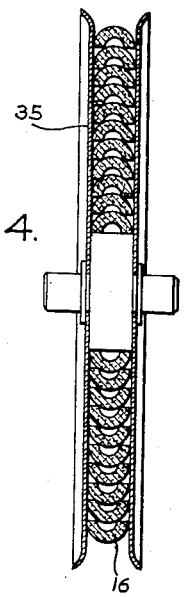
Fig. 4 is a sectional view, drawn to larger scale and taken along the line IV—IV of Fig. 1; and, Fig. 5 is a view similar to Fig. 1 but showing a modified feature of construction.

In manufacturing pre-formed flux of the character indicated, the finished flux is preferably wound on a reel 35 in the manner shown in Fig. 4, with the convex side disposed outwardly. This method of winding gives to the flux a tendency to cause it to hug the rod or wire.

Figure 5:
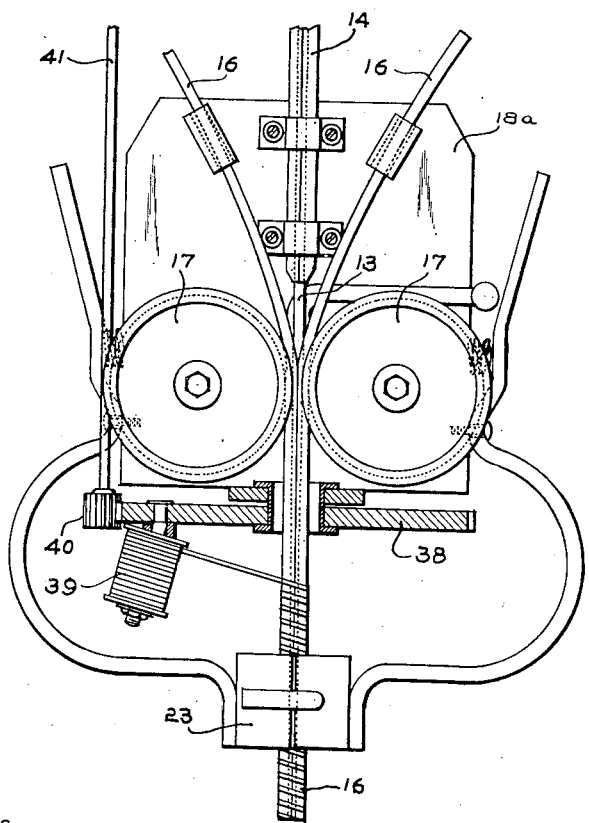

In Fig. 5, I show a construction for wrapping the flux strips should that be necessary for the purpose of holding the strips in encompassing relation with respect to the rod 13. Accordingly, in this view, the support plate 18a carries a gear 38, which supports the bobbin 39 having suitable thread or tape thereon, the gear being driven by means of the pinion 40 connected to the drive shaft 41. In this modification, as the flux-encompassed welding rod is fed downwardly, the gear 38 is concurrently rotated with the result that thread or tape is supplied from the bobbin 39 in order to helically wrap the flux-encompassed rod.

My improved welding machine operates as follows: So far as feeding the rod and establishing electrical contact therewith are concerned, standard bare rod machine practice in this regard are followed because of the good electrical contact and the possibility of giving a desired surface treatment to the rod. After the rod leaves the nozzle, complemental flux strips are fed so as to enter between the rod and presser rolls, the latter causing the flux to encompass the rod and engage the latter frictionally so as to be fed along therewith. As the flux strips are frangible, or have limited flexibility without breakage, such strips are not only fed so as to define a small angle with respect to the wire, but substantial portions thereof are exposed above the presser rolls for inward flexure by the latter toward the wire with the result that flexure is distributed over such portions and a relatively large radius of curvature is preserved at all points. The guide arranged below the presser rolls serves to hold the flux in encompassing relation. The presser rolls are separable to aid in starting the flux and preferably the guide is similarly arranged. The term "wire" as used herein, is intended to cover any metallic wire or rod element suitable for welding.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a welding head for feeding bare wire from an electrical contact device, of means providing for feeding a plurality of pre-formed and substantially non-deformable flux strips, each of arcuate section and of such radial thickness as to provide abutment side surfaces, in the same general direction as and convergently with respect to the wire so that abutment of the side surfaces of the strips and engagement of the inner concave surfaces thereof with the wire assure of encompassment of the latter by the strips, and means for causing the strips to encompass the wire under pressure sufficient to deflect them from directions of approaching the wire to that of contact parallelism with the latter.

2. The combination with a welding head for feeding bare wire from an electrical contact device, of means providing for feeding a pair of pre-formed and substantially non-deformable flux strips, each of substantially semi-circular section and of such radial thickness as to provide abutment side surfaces, in the same general direction as and convergently with respect to the wire so that abutment of the side surfaces of the strips and engagement of the inner concave surfaces thereof with the wire assure of encompassment of the latter by the strips, and means for causing the strips to encompass the wire under pressure sufficient to deflect them from directions of approaching the wire to that of contact parallelism with the latter.

3. The combination with a welding head for feeding bare wire from an electrical contact device, of means including a pair of guides carried by the head alongside of the contact device and converging toward the wire issuing from the latter and providing for feeding a pair of preformed and frangible flux strips, each of semi-circular section and of such radial thickness as to provide abutment side surfaces, in the same general direction as and convergently at a small angle with respect to the wire so that abutment of the side surfaces of the strips and engagement of the inner concave surfaces thereof with the wire assure of encompassment of the latter by the strips, and means for causing the strips to encompass the wire under pressure sufficient to deflect them from directions of approaching the wire to that of contact parallelism with the latter and to engage the wire frictionally to be fed along with the latter, said guides being spaced from said last-named means sufficiently to provide portions of the strips approaching the last-named means which are free for inward flexure by the latter toward the wire.

4. The combination with a welding head for feeding bare wire from an electrical contact device, of means providing for feeding a plurality of pre-formed and substantially non-deformable flux strips, each of arcuate section and of such radial thickness as to provide abutment side surfaces, in the same general direction as and convergently with respect to the wire so that abutment of the side surfaces of the strips and engagement of the inner concave surfaces thereof with the wire assure of encompassment of the latter by the strips, grooved rolls so disposed that the strips enter between the latter and the wire, and means for biasing the rolls toward the wire to cause the strips to encompass the wire under pressure sufficient to deflect them from directions approaching the wire to that of contact parallelism with the latter and to engage the wire frictionally to be fed along by and with the latter.

5. The combination with a welding head for feeding bare wire from an electrical contact device, of means including a pair of guides for feeding a pair of pre-formed and frangible flux strips, each of substantially semi-circular section and of such radial thickness as to provide abutment side surfaces, in the same general direction as and convergently at a small angle with respect to the wire so that abutment of the side surfaces of the strips and engagement of the inner concave surfaces thereof with the wire assure of encompassment of the latter by the strips, a pair of opposed grooved presser rolls so disposed that the strips enter between the latter and the wire, and means for biasing the rolls toward the wire to cause the strips to encompass the wire under pressure sufficient to deflect them from directions approaching the wire to that of contact parallelism with the latter and to engage the wire frictionally to be fed along by and with the latter, said guides being spaced from the rolls sufficiently to provide portions of the strips approaching the rolls which are free for inward flexure by the latter toward the wire.

ARTHUR R. ALLARD.